June 18, 1935.   S. S. ROBERTS   2,005,166
LUBRICATION SYSTEM
Filed July 6, 1932
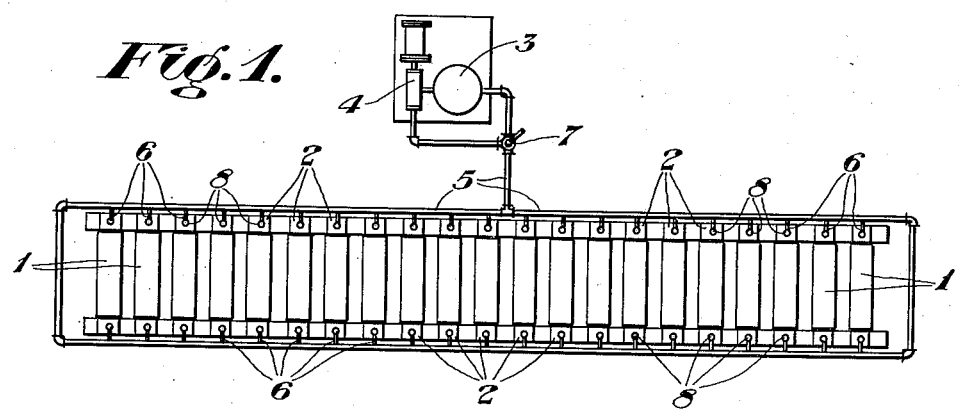
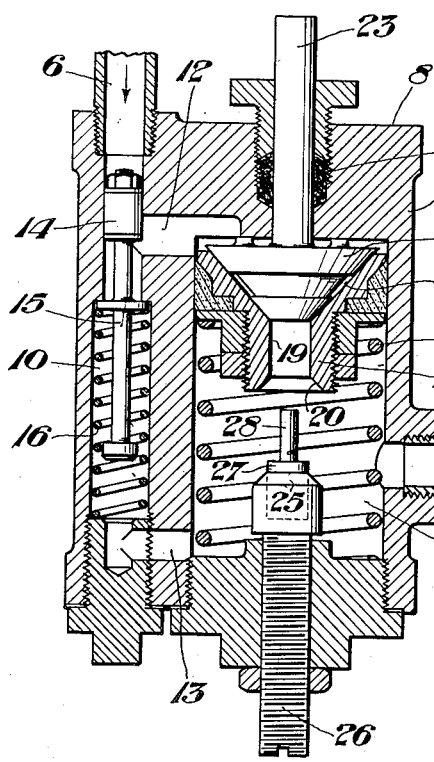
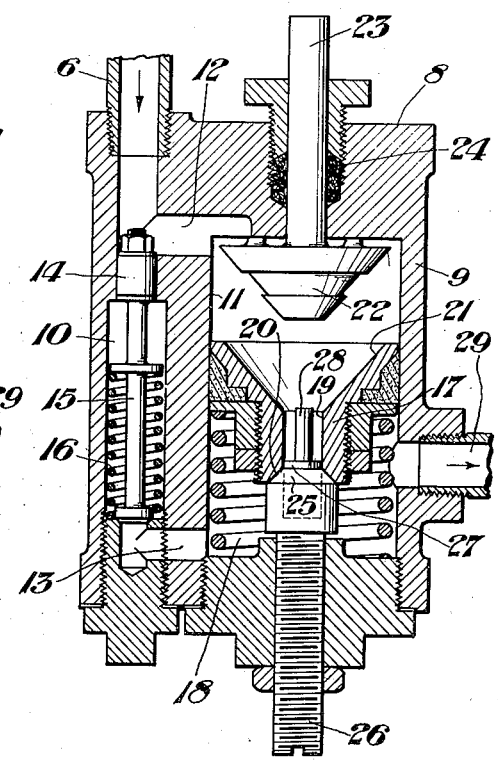
Inventor:
SAMUEL S. ROBERTS,
by Usina & Rauber
his Attorneys.

Patented June 18, 1935

2,005,166

UNITED STATES PATENT OFFICE 2,005,166

LUBRICATION SYSTEM

Samuel S. Roberts, Pittsburgh, Pa.

Application July 6, 1932, Serial No. 621,091

5 Claims. (Cl. 184—7)

This invention relates to lubrication systems and particularly those having a central supply of lubricant under pressure which is conducted to various points of application.

Such systems are used to lubricate various rolling mill machinery because of the labor reduction possible over manual systems. Many are impractical when subjected to the conditions of excessive heat and cold, massiveness of machinery and the like here encountered. Other systems, although practical, have so many pipe lines that many mill designers hesitate to use them.

One of the objects of the present inventor is to provide a system using only a single line to conduct the lubricant from its source, from which individual lines branch in multiple arrangement to points of application. Another object is to provide valves which automatically meter predeterminable lubricant charges for each application of line pressure.

Having reference to the drawing:

Figure 1 is a top plan of a roller table incorporating the new system.

Figure 2 is a longitudinal cross-section of one of the metering valves, and

Figure 3 is the same with the parts in a different position.

The above diagrammatically show a train of rolls 1 whose various bearings 2 must be lubricated periodically. By its side is a lubricant reservoir 3 in which pressure is maintained by a compressor 4. This reservoir is connected in multiple to each and all of the various bearings by a single pipe line 5 from which individual lines 6 branch. This line may also be connected to subsidiary lines from which branches lead to the mill's gearing and roll driving machinery.

The line 5 is provided with a master three-way valve 7 which selectively applies and releases the pressure in the reservoir 3 to the line 5. Metering valves 8 connect the branch lines 6 to the various journals. These are the valves which deliver a predeterminable volume or shot of grease to the points to be lubricated.

One of these valves will now be described in detail. Its body 9 forms a small cylinder 10 and a much larger cylinder 11. The smaller cylinder has a reduced upper section and communicates with the top and bottom of the cylinder 11 through ducts 12 and 13. The top is open and tapped for connection with one of the branch lines 6. A piston 14 fits its upper reduced portion and slides by the duct 12. This piston has a depending stem 15 whose lower end seats in the entrance to the duct 13, and it is urged upwardly by a spring 16 so that the duct 12 is closed. When in its lowermost position this duct is open while the duct 13 is closed.

A bored piston 17 fits the large cylinder 11 and is urged upwardly by a spring 18. Its bore is shaped to form a cylindrical central portion 19, a slightly flaring bottom seat 20 and a much greater flaring top seat 21.

When the piston 17 is in its upper position its top seat 21 is closed by a large valve 22 whose stem 23 extends upwardly through and above the body 9. This stem is provided with a packing 24.

When the piston 17 is in its lowermost position its bottom seat 20 is closed by a valve 25 whose stem 26 extends through the bottom of the body 9 and is in screw threaded engagement therewith. This valve has a short cylindrical section 27 which fits the cylindrical portion 19 of the bore in the piston. It also has a small upstanding stem 28 of sufficient length to lift the valve 22 from its seat in the piston 17 just after the cylindrical section 27 of the valve 25 enters the cylindrical portion 19 of its bore.

When pressure is applied to the branch line 6 the piston 14 will be forced downwardly and close the entrance to the duct 13. This opens the duct 12 so that pressure is applied to the top of valve 22 and piston 17. As these travel downwardly any lubricant in the large cylinder 11 will be forced through an outlet 29 which is connected to the point to be lubricated. The duct 12 acts as the cylinder's inlet.

As the valve 22 and piston 17 continue downwardly the cylindrical section 27 of the valve 25 enters the straight portion 19 of the bore in the piston. Immediately after this occurs the small stem 28 on the valve 25 cracks the valve 22 from its seat 21 in the piston.

The lubricant now flows between this seat and the valve and forces the latter upwardly because of the differential pressures between its top and bottom surfaces. The piston continues downwardly until the valve 25 fits its seat, closes the bore and stops the passage of lubricant therethrough completely. This stoppage is not complete when the straight section 27 of the valve 25 first enters the straight portion 19 of the piston 17 because of the practical impossibility of making a commercial product with the exactness which would be required. The valve remains in this position until pressure is released.

When this occurs the small piston 14 is pushed upwardly by the spring 10 and closes the duct 12 which forms the inlet to the large cylinder 11. The fact that this piston is so small permits the use of a much weaker closing spring than is otherwise possible. For instance, if the spring 18 were depended upon to force the piston 17 upwardly to crack the valve 25 it would be necessary to use an extremely heavy spring. It is to be understood that although the pressure is released in the line 5 there is still considerable resistance effect because of the relatively high viscosity of the body of lubricant which must be moved. In the case of the piston 14 the amount necessarily displaced is very small and consequently requires little force. In the case of the larger piston the amount is relatively large and requires considerable force.

As the piston 14 closes the inlet 12 and segregates all of the valve's working parts from the system, the duct 13 is simultaneously opened and communication established between both ends of the cylinder. The spring 18 then pushes the piston 17 upwardly so that the bore 19 is opened and the lubricant above forced through into the lower portion of the cylinder. This action easily occurs because the flow has two open paths. These are through the duct 12 and out the duct 13 and directly through the bored piston 17.

When the piston reaches its uppermost position the lower portion of the cylinder will contain the amount of lubricant which will be sent to the desired point at the next pressure increase in the system. Adjustment of the stem 26 will move the valve 28 so that the piston stroke is thereby adjustably limited. This permits the volume of the ejected charge to be varied.

The motion of the upper valve 22 may be observed by means of its projecting stem 23 so that the mill men may be assured of the proper function of each and every valve. In addition, measurement of this stem's motion is an accurate indication of the working stroke of the piston 17.

Although a specific form of this invention has been shown and described in accordance with the patent statutes, it is not intended to limit its scope exactly thereto, except as defined by the following claims.

I claim:

1. A metering valve including parallel small and large cylinders respectively constructed and arranged so that the large one has an inlet from the smaller cylinder and an outlet to the device to be lubricated and the small one has an inlet for lubricant under pressure and a bore communicating with the outlet end of the large one, means including a piston in said small cylinder constructed to cut off communication between its inlet and the bore to the outlet end of said large one when moved theretowards by lubricant entering the inlet and to establish communication between opposite ends of said large cylinder and said bore through the inlet to the large cylinder, when oppositely moved upon release of pressure and simultaneously close the inlet to the small cylinder, a longitudinally bored piston in said large cylinder having valve seats at both ends, a sliding valve fitting the seat of the bore in said second named piston towards said inlet and having a stem projecting through the end wall of said large cylinder, an adjustably fixed valve fitting the other seat of the bore in said piston when said piston is moved towards the outlet end of said large cylinder and including a portion constructed and arranged to effect closure of the piston bore slightly before seating of the piston against said fixed valve and a stem sufficiently long to then crack said first named valve from its seat upon further movement of the piston and springs for urging said pistons toward the inlets of the respective cylinders.

2. A metering valve including the combination of a cylinder having an entrance in one end and an exit in the other, a piston fitting said cylinder and having a longitudinal bore, a spring urging said piston towards the entrance end of said cylinder, a valve arranged to reciprocate in said cylinder between its entrance end and said piston, said valve closing the bore in the piston when said spring urges the piston towards the entrance end of the cylinder and remaining closed during the discharge stroke of the piston and being constructed to present a larger surface area towards the piston than towards the entrance end of the cylinder, a stationary valve in the exit end of said cylinder for closing the bore in said piston, said piston having valve seats at its opposite ends for the respective valves, and a means for cracking said reciprocating valve from its seat when said piston approaches adjacent said stationary valve.

3. A metering valve including the combination of a cylinder having an entrance in one end and an exit in the other, a piston fitting said cylinder and having a longitudinal bore, a spring urging said piston towards the entrance end of said cylinder, a valve arranged to reciprocate in said cylinder between its entrance end and said piston, said valve closing the bore in the piston when said spring urges the piston towards the entrance end of the cylinder and remaining closed during the discharge stroke of the piston and being constructed to present a larger surface area towards the piston than towards the entrance end of the cylinder, a stationary valve in the exit end of said cylinder for closing the bore in said piston, said piston having valve seats at its opposite ends for the respective valves, means for cracking said reciprocating valve from its seat when said piston approaches adjacent said stationary valve, and means for obstructing the bore of said piston as said reciprocating valve, arranged to reciprocate in said cylinder, is cracked from its seat by said first named means and prior to the bore's closure by said stationary valve.

4. A metering valve including the combination of a cylinder having an entrance in one end and an exit in the other, a piston fitting said cylinder and having a longitudinal bore, a spring urging said piston towards the entrance end of said cylinder, a valve arranged to reciprocate in said cylinder between its entrance end and said piston, said valve closing the bore in the piston when said spring urges the piston towards the entrance end of the cylinder and remaining closed during the discharge stroke of the piston and being constructed to present a larger surface area towards the piston than towards the entrance end of the cylinder, a stationary valve in the exit end of said cylinder for closing the bore in said piston, said piston having valve seats at its opposite ends for the respective valves, means for cracking said reciprocating valve from its seat when said piston approaches adjacent said stationary valve, and means operable by pressure decreases on lubricant in the entrance of said cylinder for closing said entrance and establishing communication between the ends of the cylinder by an external path.

5. A metering valve including the combination of a cylinder having an entrance in one end and an exit in the other, a piston fitting said cylinder and having a longitudinal bore, a spring urging said piston towards the entrance end of said cylinder, a valve arranged to reciprocate in said cylinder between its entrance end and said piston, said valve closing the bore in the piston when said spring urges the piston towards the entrance end of the cylinder and remaining closed during the discharge stroke of the piston and being constructed to present a larger surface area towards the piston than towards the entrance end of the cylinder, a stem carried by said reciprocating valve and slidably projecting through and beyond the entrance end of said cylinder, a stationary valve adjustably arranged in the exit end of said cylinder for closing the bore of said piston, said piston having valve seats at its opposite ends for the respective valves, and means for cracking said reciprocating valve from its seat when said piston approaches adjacent said stationary valve.

SAMUEL S. ROBERTS.